United States Patent [19]
Cottle et al.

[11] Patent Number: 5,900,598
[45] Date of Patent: May 4, 1999

[54] LIFT SENSOR

[75] Inventors: Dennis E Cottle; Peter John Thomson, both of Christchurch, Netherlands

[73] Assignee: T L Jones Limited, Christchurch, New Zealand

[21] Appl. No.: 08/793,764

[22] PCT Filed: Jul. 26, 1995

[86] PCT No.: PCT/NZ95/00067

§ 371 Date: Mar. 11, 1997

§ 102(e) Date: Mar. 11, 1997

[87] PCT Pub. No.: WO96/08734

PCT Pub. Date: May 21, 1996

[30] Foreign Application Priority Data

Sep. 16, 1994 [NZ] New Zealand .......................... 264468

[51] Int. Cl.[6] .............................. B66B 13/26; E05F 15/02
[52] U.S. Cl. ................................ 187/317; 49/26; 250/221
[58] Field of Search ............................ 187/317; 49/26, 49/28; 250/221

[56] References Cited

U.S. PATENT DOCUMENTS

| | | | |
|---|---|---|---|
| 3,875,403 | 4/1975 | Svensson | 250/209 |
| 4,650,990 | 3/1987 | Jonsson | 250/221 |
| 4,742,337 | 5/1988 | Hang | 340/556 |
| 4,794,248 | 12/1988 | Gray | 250/221 |
| 5,149,921 | 9/1992 | Picado | 187/317 |
| 5,420,430 | 5/1995 | Trett | 250/341 |
| 5,424,532 | 6/1995 | Occheto et al. | 250/221 |
| 5,567,931 | 10/1996 | Amend et al. | 250/221 |
| 5,583,334 | 12/1996 | Baumann | 250/221 |

FOREIGN PATENT DOCUMENTS

| | | |
|---|---|---|
| WO 84/02413 | 6/1984 | WIPO . |
| WO 89/07276 | 8/1989 | WIPO . |
| WO 90/08092 | 7/1990 | WIPO . |

*Primary Examiner*—Robert E. Nappi
*Attorney, Agent, or Firm*—Merchant, Gould, Smith, Edell, Welter & Schmidt, P.A.

[57] ABSTRACT

An optical obstructing sensing system is described. Control signals are optically transmitted across the obstruction sensing area thereby obviating the need for a physical connection between the array of emitters and receivers which define the obstruction sensing area. Optical commands control the scanning functions of the obstruction sensing array. The optical conditions in the obstruction sensing area are analysed by means of optical beams transmitted from one side of the obstruction sensing area to the other. In this manner, corrections for ambient light, obstruction sensing array geometry, and spurious signals may be accounted for and inappropriate compensation made. The invention further describes an obstruction sensing method where the decision as to whether an obstruction is present in the sensing area depends on the optical environment, geometry of the obstruction sensing area and intervening obstructions. These factors are taken into account in deciding whether a valid obstruction event is detected. The invention may find particular application in elevator doors, industrial machinery or similar applications.

7 Claims, 5 Drawing Sheets

LIFT SENSOR

TECHNICAL FIELD

This invention relates to obstruction sensing systems, particularly for sensing obstructions in a scanned area between elevator doors. Particularly, although not exclusively, the invention relates to an infra-red scanning system for elevator doors incorporating ambient light compensating electronics and an adaptive decision based sensor operation strategy.

BACKGROUND TO THE INVENTION

In the prior art, it has been recognised that an effective method of detecting an object intruding into or through a specified area is by monitoring an array of light beams spanning that area. Such an arrangement of optical paths as are known in the art can be created by the sequential activation of pairs of infra-red transmitters and receivers. Sequential high speed scanning of the infra-red transmitters and receivers effectively creates a screen of beams. In the event that an obstruction breaks one of more beams, an intrusion condition is sensed and appropriate action can be taken. In the case of elevator doors, such an obstruction event would normally activate a relay which halts or reverses the movement of the door.

Such elevator door sensing systems must be able to detect the presence of passengers or obstacles between the doors at all door positions and numerous systems have been proposed to achieve this.

Many systems known in the art use infra-red transmitters and sensors to establish the screen of beams in the area between the lift doors. Systems such as these can be prone to interference from ambient light impinging on the sensors. This results in spurious noise signals which can render the door obstruction detection system inoperative leading to inconvenience to lift passengers.

It is well known in the art to strobe the emitter/receiver array thereby creating a 'screen' or 'wall' of optical paths in the area between the doors. However, this requires communication across the door gap so that triggering or detector selection pulses may be communicated from a controller to the components of the emitter/detector array. This is conventionally achieved by means of a physical electrical connection between the doors, such as a cable. By necessity, this type of mechanical arrangement is usually movable as it is attached between the door units or a single door and slamming post. Any such connection is therefore prone to wear from repeated open/close cycles of the elevator doors.

Also, many prior art detection techniques operate by merely detecting either the absence or presence of an optical signal and triggering the door-opening mechanism accordingly. This does not allow for the possibility for small or variable signals being valid optical signals (ie.; those corresponding to an unbroken beam) and therefore such detection systems can produce unnecessary obstruction triggering events. Variable signals can be the result of aging of optical emitters and detectors, deterioration of the optical properties of the mounting construction and variations in the ambient optical conditions in the obstruction detection area.

In situations where the elevator doors are close, ie.; just prior to closure, the light beam intensity in the obstruction detection area may be sufficiently high that a hand or a similar obstruction will not break the light beam and no door obstruction event will be triggered. Human flesh does not attenuate high intensity infra-red wavelengths completely, therefore this effect is particularly significant if infra-red transmitters are used.

Another difficulty is that an obstruction which is close to a reflective surface in the detection area, can produce an optical signal resulting in spurious detection signals. Such a reflective surface might be the sill of the car door. It is therefore desirable to be able to distinguish between reflection, low intensity signals, and direct signals.

DISCLOSURE OF THE INVENTION

It is an object of the present invention to provide an obstruction detection system which overcomes or mitigates at least some of the abovementioned problems or to at least provide the public with a useful choice.

In one aspect the present invention provides for an obstruction sensing system comprising:

at least one first component and at least one second component, where the first and second components are spatially separate and include an array of optical emitters and receivers respectively which are arranged to define a plurality of optical paths in an obstruction detection area, wherein at least one emitter and receiver pair optically communicates control commands between the spatially separate components, where the control commands relate to the operation of the array of optical emitters and receivers.

Preferably the optical emitters and receivers operate at substantially infra-red wavelengths.

Preferably the optical emitters and receivers transmit and receive signals of varying duration and/or timing and/or frequency where the duration and/or timing and/or frequency correspond to specific control commands.

Preferably the control commands relate to the sequential operation of the array of infra-red emitters and receivers.

Preferably a first signal of fixed duration corresponds to an instruction to activate the next infra-red emitter in a predetermined sequence and a second signal of fixed duration to reset the sequence to the first infra-red emitter of a predetermined sequence.

Preferably the first signal is of shorter duration than the second signal.

Preferably, the second signal synchronises a predetermined emitter activation sequence with a predetermined receiver activation sequence.

Preferably, the predetermined emitter and receiver activation sequences are adapted to provide a plurality of optical path patterns in the detection area, said patterns corresponding to at least one of a pattern of horizontal optical paths spanning the detection area, a pattern of up-angled optical paths spanning the detection area or a pattern of down-angled optical paths spanning the detection area.

Preferably the first and second signals may comprise bursts of third signals where the third signals are of substantially shorter duration than either the first or second signals.

Preferably the burst frequency is either about 44 kHz or 200 kHz.

Preferably the first and second pulses are about 120 $\mu$sec and about 380 $\mu$sec in duration respectively.

Preferably the first and second pulses occur at about 1.25 msec intervals.

Preferably the obstruction sensing system is incorporated in an arrangement of elevator doors where the first component comprises:

an infra-red emitter array adapted to be responsive to infra-red beam driver circuitry, where at least one of the elements of the infra-red emitter communicates control commands; microprocessor and beam address logic adapted to provide control commands;

infra-red emitter beam driver circuitry, where the first component is located proximate one edge of an elevator door; and the second component comprises:

a photodiode array adapted to be responsive to optical conditions between said doors where at least one element of the photodiode array is responsive to the control commands;

signal processing circuitry; microprocessor and beam address logic adapted to be responsive to the control commands; and where the second component is located proximate the edge of the elevator door opposite that where the first component is located.

According to a further aspect of the invention there is provided a method of detecting an obstruction in an obstruction sensing system comprising:

analysing the optical conditions in an obstruction sensing, area and modifying obstruction event criteria based thereon; and determining the presence or absence of an obstruction based on that criteria.

Preferably the geometry of the obstruction sensing area is determined from the sensed optical conditions.

Preferably the optical conditions corresponds to the intensity of one or more optical beams transmitted in such a manner as to define the obstruction sensing area.

Preferably the obstruction event criteria may be varied in response to changes in the dimensions of the obstruction sensing area.

Preferably said method of detecting an obstruction further comprises:

sensing first optical conditions corresponding to no transmitted optical beams thereby determining the ambient optical conditions in an obstruction sensing area;

sensing second optical conditions with transmitted optical beams thereby determining the transmitted beam intensity contribution to the total optical intensity in the obstruction sensing area; and comparing the second optical conditions with obstruction event criteria thereby determining if an obstruction is present in the obstruction sensing area.

Preferably the optical sensing measurement step may be repeated four times and averaged thereby minimising the effect of the ambient optical conditions.

Preferably the obstruction sensing area may correspond to an area between two elevator doors and an obstruction event triggers the halting or opening of the elevator doors.

Preferably the method of detecting an obstruction in an obstruction sensing system comprises:

measuring a first signal;

if the first signal is above a first voltage, an obstruction event is actioned for first signals which are less than a second voltage;

if the first signal is substantially between a second voltage and a first voltage, then an obstruction event is actioned for first signals which are less than a third voltage;

a second signal representing the noise level is measured;

if the second signal is above a fourth voltage an obstruction event is actioned;

a third signal representing the noise level plus the signal level is measured;

if the third signal is less than the second signal by more than a voltage an obstruction event is actioned; and if no obstruction event is actioned, the above process is repeated for the next emitter/photodiode pair in a predetermined sequence, if an obstruction event is actioned, an interface relay is released and the elevator doors open.

Preferably the method of detecting an obstruction in an obstruction sensing system comprises:

measuring a first signal;

if the first signal is above a certain voltage, preferably about 2.5 V, then an obstruction event is actioned for first signals which are less than a certain voltage, preferably about 1.5 V;

if the first signal is substantially between a certain voltage, preferably 1.5 V and a certain voltage, preferably 2.5 V, then an obstruction event is actioned for first signals which are less than a certain voltage, preferably about 0.1 V;

a second signal representing the noise level is measured;

if the second signal is above a certain voltage, preferably about 3.5 V, an obstruction event is actioned;

a third signal representing the noise level plus the signal level is measured;

if the third signal is less than the second signal by more than a certain voltage, preferably about 1.5 V, then an obstruction event is actioned; and if no obstruction event is actioned, the above process is repeated for the next emitter/photodiode pair in a predetermined sequence, if an obstruction event is actioned, an interface relay is released and the elevator doors open.

Preferably the method may include measurements taken between emitter/photodiode pairs wherein such pairs are sequentially selected to produce different scan patterns.

Preferably the scan sequence may correspond to the activation of substantially opposite emitter/photodiode pairs.

Preferably the scan sequence may correspond to the activation of emitter/photodiode pairs which are displaced vertically with respect to one another.

The invention will now be described by way of examples only and with reference to the accompanying drawings in which.

BRIEF DESCRIPTION OF THE DRAWINGS

The scan patterns employed by the present invention are similar to those known in the art and the following nomenclature will be used to distinguish the various beam configurations and sequences:

a complete scan of the obstruction sensing area comprises a series of one or more partial scans; and a partial scan corresponds to a particular scan pattern produced by activating selected optical emitter/receiver pairs.

Figure 1A:
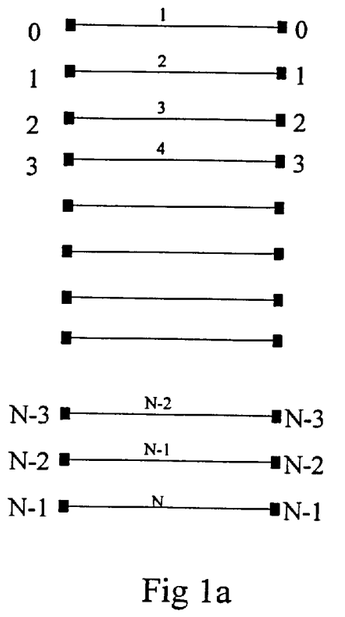
FIG. 1a illustrates a horizontal scan pattern (partial).
Figure 1B:
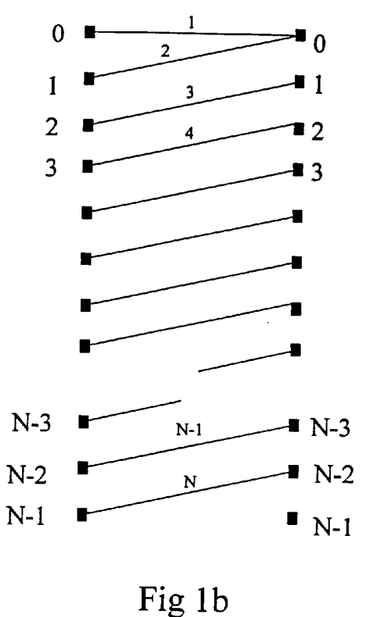
FIG. 1b illustrates an up scan pattern (partial).
Figure 1C:
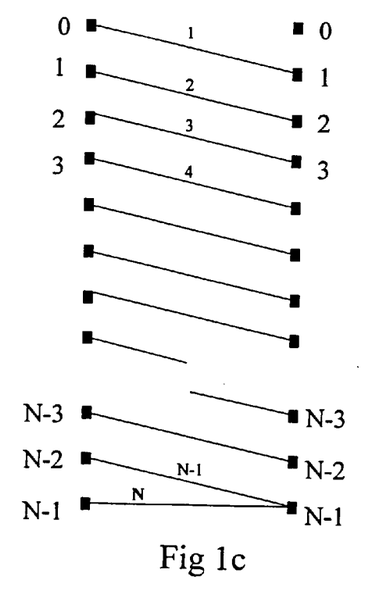
FIG. 1c illustrates a down scan pattern (partial).

In the examples shown in FIGS. 1a, 1b and 1c, the emitters are located on the left and the receivers on the right.

The scans are produced by sequentially activating the infrared (hereafter referred to as IR) emitters on one side of the door with the scan geometry controlled by a receiver microprocessor selecting a particular sequence of receivers on the door opposite the activated emitter.

For example, in an angled-down scan (FIG. 1c) the emitters are sequentially activated starting with emitter $E_0$ which corresponds to an emitter at the top of the scan pattern, incrementing each emitter number by one and ending with emitter number $E_{N-1}$ (for N−1 emitters). For an angled-down scan, if emitter $E_n$ is activated, the signal is taken from photodiode $P_{n+1}$ thereby producing an angled-down scan ($E_n$, $P_{n+1}$).

For a horizontal scan ($E_n$, $P_n$), emitter $E_n$ is activated and the signal from photodiode $P_n$ is measured. In this example, the emitters and photodiodes are generally directly opposite each other and are equal in number. In examples 1a and 1b, the final emitter/photodiode pair activated preferably corresponds to a horizontal ($E_{N-1}$, $P_{N-1}$) beam.

While the partial scan patterns discussed correspond to horizontal, up and down partial scans, it is possible that other partial scan patterns may be implemented depending on the particular situation. Such modifications are considered to be within the scope of one skilled in the art.

Figure 2:
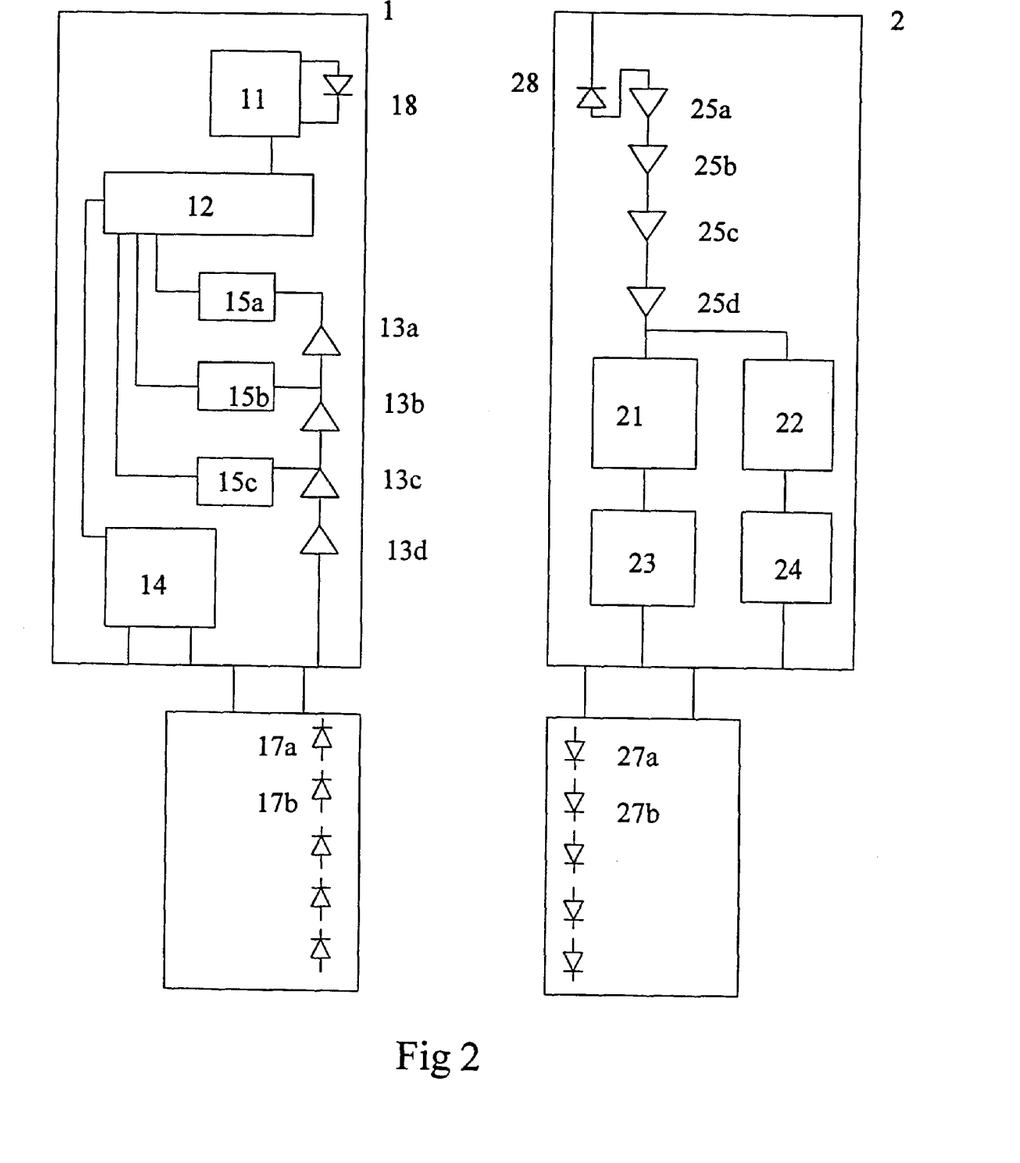
FIG. 2 illustrates a simplified schematic circuit layout.

FIG. 2 illustrates a schematic diagram of an example of an obstruction sensing system. The particular circuit described in this example is intended for use in side opening elevator doors.

Referring to FIG. 2, receiver control board 1 includes a control beam IR emitter diode 18 which is controlled by control beam driver 11. Microprocessor 12 provides control command signals which are transmitted across the door gap by means of IR emitter diode 18.

Microprocessor 12 also controls beam address logic 14 which produces the desired beam scan pattern by sequentially activating photo-detectors 17a, 17b, etc on board 16. Photo-detectors 17a, 17b etc have outputs connected to amplifier chain 13a–13d. The outputs of the amplifier chain are picked off by demodulators 15a, 15b and 15c and fed to microprocessor 12. The microprocessor 12 responds to the demodulator outputs by transmitting control commands to the spatially separate transmitter board 2, which may reset the partial scan or step to the next emitter/photodiode pair in the particular partial scan sequence. The microprocessor 12 also uses the signals from the demodulators to determine the optical conditions in the scan area.

Again referring to FIG. 2, transmitter control board 2, includes control beam IR receiver photodiode 28. The control beam receiver photodiode 28 is optically responsive to the control commands transmitted by IR emitter. The receiver output is fed into an amplifier chain 25a–25d. The amplified control signals are processed by transmitter sequence logic 21 which sequentially activates IR emitters 27a, 27b etc by means of IR emitter beam driver 23, beam address logic 24, and sync separator 22.

The input and output boards 16 and 26 may be divided into a number of modular component boards for ease of manufacture and servicing.

Transmitter and receiver control boards 2 and 1, and input and output boards 16 and 26 respectively are mounted along the edge of the obstruction detection area (ie.; along the edge of the elevator doors, or slightly recessed therein). A power supply unit is mounted above the elevator car and is adapted to accept a variety of AC and DC inputs. The power supply in this particular example provides a regulated 12 V supply. The power supply also houses the interface relay, the audible warning alarm and the alarm control circuitry.

Figure 3:
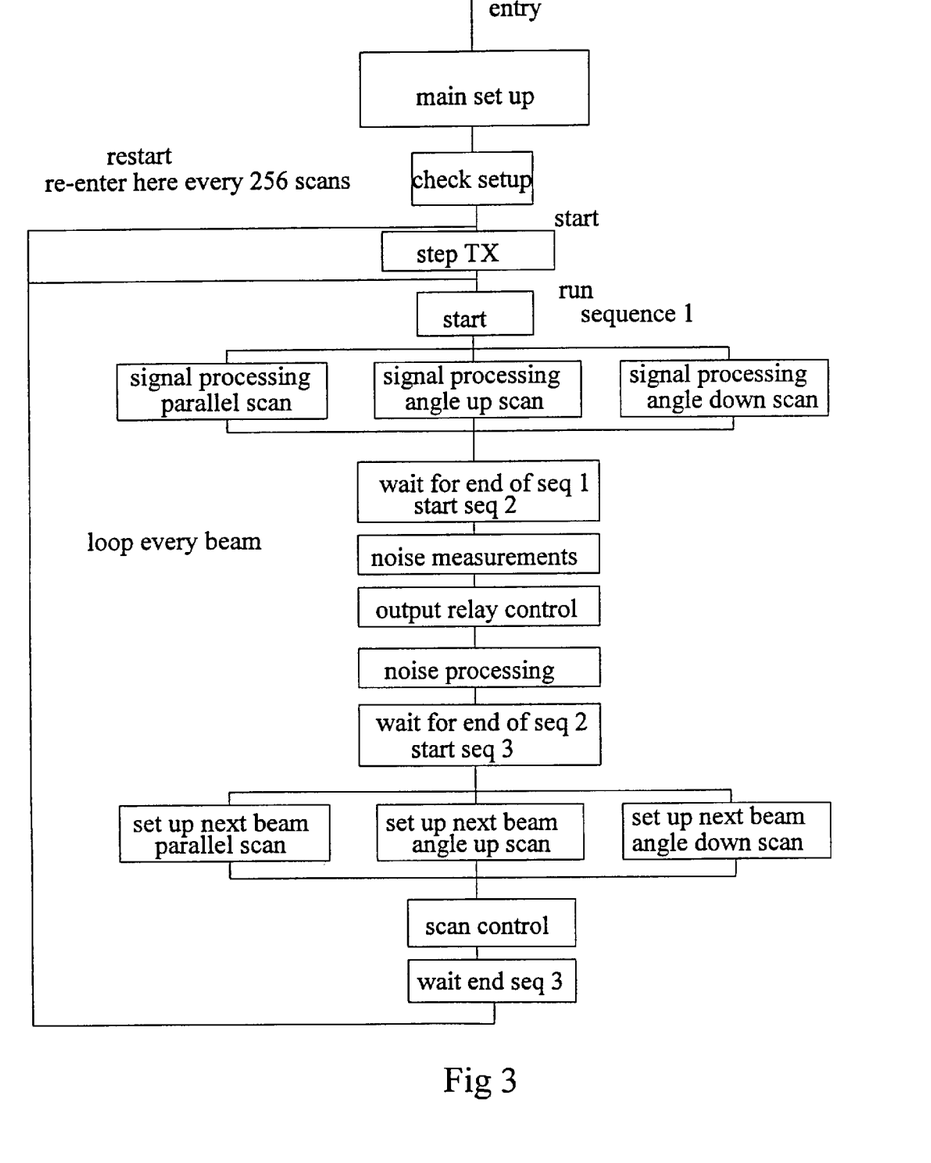
FIG. 3 is a flowchart illustrating an obstruction detection procedure.

Referring to FIG. 3 the method of operating the obstruction sensing system of FIG. 2 is shown. Assuming that the power-up diagnostics are successful, the scanning sequence is initiated. The transmitter control beam (hereafter referred to as the TX control beam) driver 11 sends a long IR pulse which signals to the transmitter control board 2 that the beam scanning sequence is to be reset. The initial sequence (sequence 1) corresponds to the selection of the particular partial scan pattern. A horizontal beam partial scan pattern is selected and the activation of the emitter/photodiode pairs begins. The partial scan pattern is a function of which photodiode the nth emitter is paired with).

For each of the pairs selected, the following beam analysis sequence (sequence 2) is performed: Processor 12 keeps a running average of the reading of the demodulators 15a, 15b and 15c and uses this average to decide what detection strategy to use. If the average signal picked off the amplifier chain (13a–13d) by demodulator 15b is above 2.5 V, the processor assumes that the elevator door is almost closed and modifies the obstruction event criteria so that a signal of less than 1.5 V indicates a broken beam.

If the average signal at demodulator 15b is between 2.5 V and 1.5 V then the beam is assumed to be broken if the signal at demodulator 15b falls below 0.1 V.

If the average is below 0.5 V then the signal from demodulator 15a is used. 15a uses the full gain of the amplifier chain to achieve a maximum range so there will be some background noise—usually about 0.5 V at the demodulator.

The previous steps establish the operating regime appropriate for the detection system and it is to be appreciated that the step of determining the door separation obviates the need for defocusing of the IR beams or similar techniques that are known in the art. These methods are intended to overcome the difficulty associated with the transparency of human flesh to IR radiation by reducing the IR beam intensity at small emitter/photodiode separations.

Microprocessor 12 checks the noise level when the transmitter is off, and if it is above 3.5 V then it is too noisy to make a decision so the door goes to a fail-safe condition and drops out the beam obstruction relay. If it passes the noise check, the microprocessor 12 checks to see if the signal+noise at demodulator 15c is greater than the noise at 15c by at least 1.5 V. If it is not, then the processor decides that the beam is broken. Although it is not always necessary, all demodulator 15c measurements in this example are sampled 4 times and averaged to minimise the effects of noise. The decision as to whether the beam is broken is done once and is not rechecked. However, a total of 8 readings (4 of noise and 4 of signal+noise) are used in making that decision.

If microprocessor 12 decides that the beam is broken, it releases the interface relay. Once the relay is released it remains released until the beam scan sequence is re-established. It is held in for a minimum of 0.5 sec before releasing.

It is to be appreciated that the voltage levels described above, are indicative of the particular configuration in this example. It is within the purview of a skilled technician to modify the voltage levels in accordance with various modifications to the system. Such modifications may be different power supplies, components, variations in the physical characteristics of the obstruction sensing application and different optical characteristics of the obstruction sensing area The above process (sequence 2) is performed each time an emitter/photodiode pair is selected. If an obstruction event is detected, this condition is recorded in software and appropriate action is taken. The partial scan sequence continues and the instruction to step to the next emitter is communicated via the TX control beam by means of a short IR pulse from diode 18. This cycle is repeated (sequence 2 and 3) until the partial scan pattern is completed. After the Nth beam is measured, the angle-up scan pattern is started, the emitter/photodiode pairs ($E_n$, $P_{n-1}$) are sequentially selected, and the beam conditions are analysed as described above. Finally, the angle down scan ($E_n$, $P_{n+1}$) is started and the same obstruction detection strategy applied as above.

Should it be necessary to reset the partial scan sequence after, for example, an obstruction event, the microprocessor 12 sends a reset pulse (long IR pulse) via the TX control beam to the transmitter control board 2. The scan sequence is reset to emitter n=O and the process restarts.

It can be seen that in the example illustrated by FIG. 2, the emitters are slaved to the TX control beam transmitted across the door gap, and because they are responsive to no more than two commands which either step to the next emitter or reset to the first emitter in the partial scan, the processing, decision making and photodiode selection is carried out at one location and there is no need to transmit any complex information such as signal levels etc, across the door gap. Accordingly, the susceptibility of the system to noise is reduced and the need for a physical electrical connection capable of carrying such data is obviated.

Figure 4:
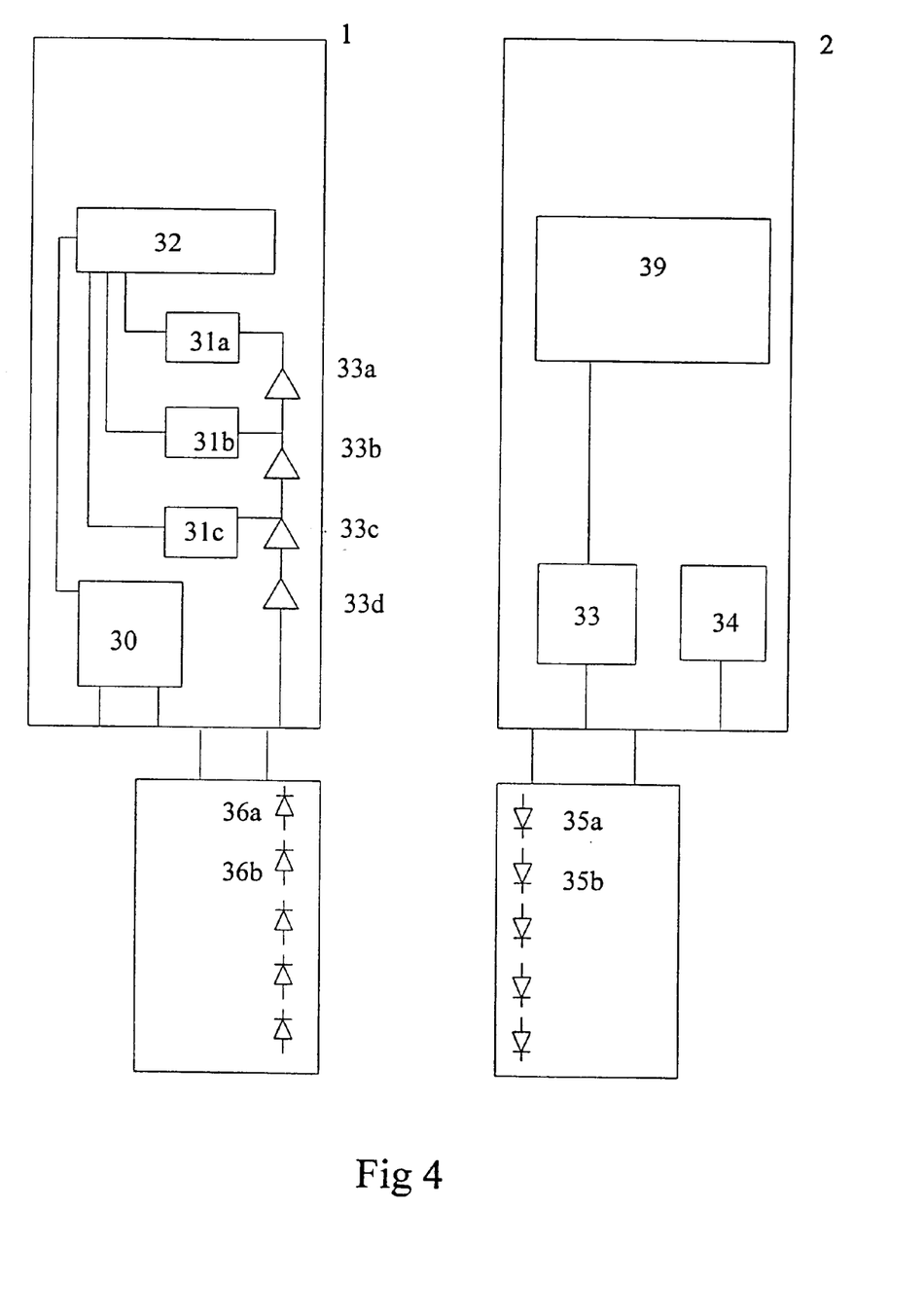
FIG. 4 illustrates a simplified schematic circuit layout corresponding to an alternative embodiment.

FIG. 4 illustrates an alternative embodiment of the present invention. It is similar to the example shown in FIG. 2 however, the control beam is transmitted between an emitter/receiver pair in the array (for example 35a and 36a) rather than by a separate emitter/photodiode pair (18 and 28 in FIG. 2). In this example an additional microprocessor 39 on the transmitter board controls the emitter beam driver 33. Beam address logic is indicated by 24. The microprocessor on the receiver board is indicated by 32.

Referring to FIG. 4, the n=0 emitter/receiver pair act as a TX control beam transmission means.

A synchronisation pulse is transmitted across the door gap at the start of each partial scan. This pulse initialises the particular partial scan which is followed by a sequence corresponding to an up, down, or horizontal partial scan. There is no short TX command pulse transmitted across the door gap and each step from one emitter to the next is independent of that from one receiver to the next. Effective emitter/receiver coincidence timing results from using the synchronisation pulse and the closely matched clock signals from the microprocessors 39 and 32.

Each partial scan sequence may start with either the photodiode pair used to transmit the synchronisation signal (n=0) or the next emitter/receiver pair in the partial scan sequence (n=1). In the example given, a sequence of three partial scans constitute a complete scan of the detection area.

Again referring to FIG. 4, the synchronisation pulse is transmitted across the door gap. Once synchronised, the emitter pulses and receiver activations are clocked from crystals on microprocessors 39 and 32 respectively. The crystal oscillators are highly accurate and once the (n=0) receiver processor 39 is synchronised with the control signal (in this embodiment triggered by the leading edge of the synchronisation pulse), the receiver processor 39, will scan the receivers in a sequence corresponding to a particular partial scan pattern. In this example, the partial scan ends with a horizontal single beam event (the n=N-1 emitter/receiver pair), following which the sequence is re-synchronised by means of the control beam.

If synchronisation is lost due to the obstruction of the n=0 beam, the relay will be released and the scan fail indicator activate. If synchronisation fails due to there being no transmitter signal present, the beam relay will be released, the scan fail indicator activate and the receiver will commence 'free running'. This enables many of the receiver functions to be tested without a transmitter being present.

The example shown in FIG. 4 simplifies the construction as well as the controlling software. Fewer components are required and the overall complexity of the system is reduced. However, in certain applications, it may be necessary or desirable to transmit a variety of control commands across the scan area In the latter case, the circuit in FIG. 2 could be used.

Figure 5:
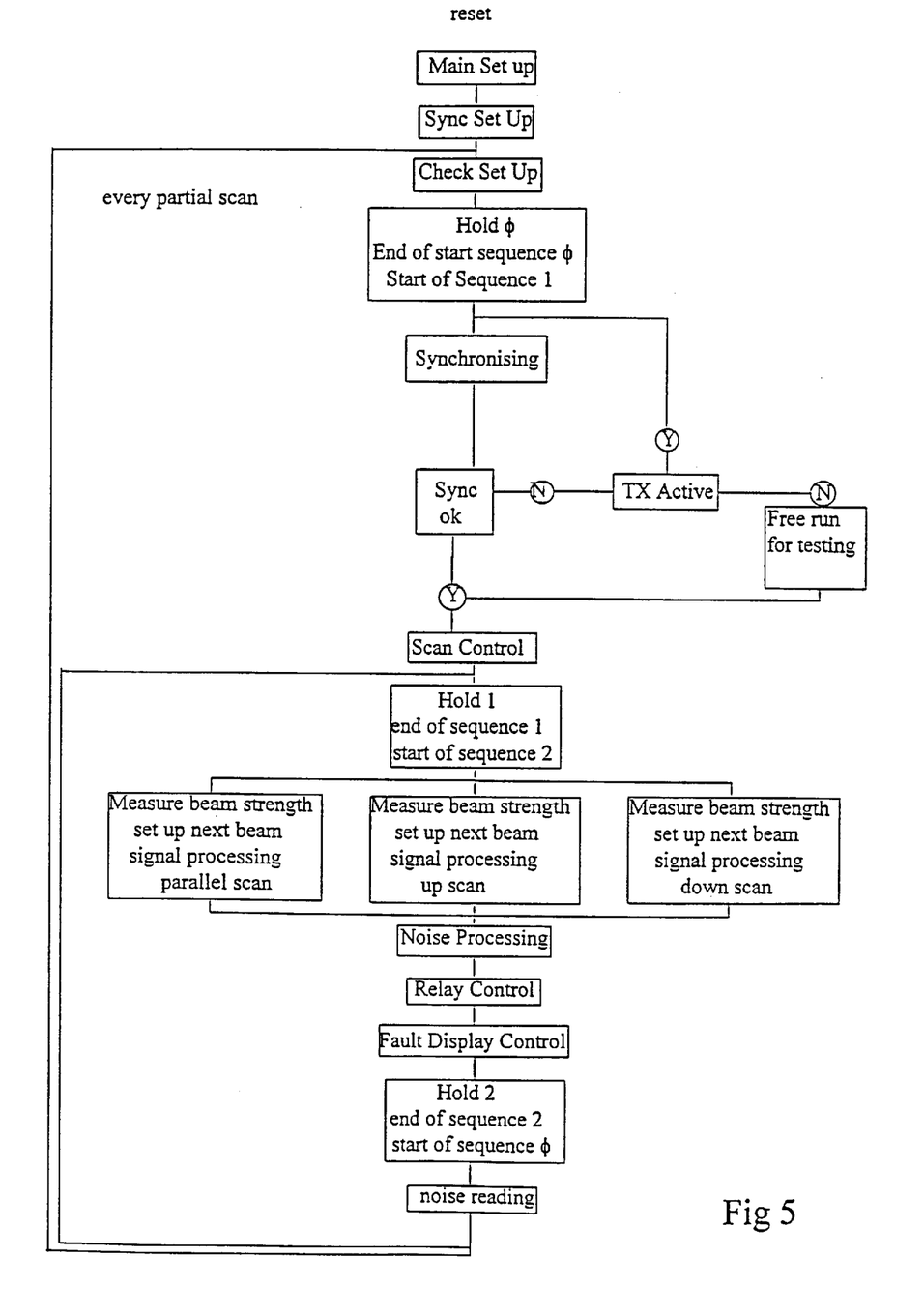
FIG. 5 is a flowchart illustrating an alternative obstruction detection procedure.

The obstruction detection method for use with the circuit of FIG. 4 is shown is FIG. 5. The primary difference between this detection method and that shown in FIG. 3 is that the only command transmitted across the door gap is a synchronisation pulse whereby at every partial scan (ie; up, down and horizontal), the partial scan sequence synchronisation is checked and synchronised.

It is further envisaged that the synchronisation pulse may correspond to the first beam activation of any partial scan itself, with microprocessor synchronisation being triggered from the leading edge of the obstruction detection pulse. Other possibilities include synchronising the partial scan sequences from other characteristics of the scanning beams such as location in the array, length or other variations in the scan pattern or sequence.

In FIG. 2 and FIG. 4, the control (TX) beam drive signal consists of bursts of pulses with a frequency of 200 kHz and 44 kHz respectively. A short control pulse is 120 $\mu$sec long and a long control pulse is 380 $\mu$sec long. Referring to FIG. 2, the TX control beam command set is not restricted to a synchronisation or step and reset instruction. It is envisaged that other commands may be transmitted and coded by similar or other modulation techniques. The TX beam controller obviates the need for a physical connection between the emitter control and photodiode control. Other modulation and/or burst frequencies are envisaged, such modifications and variation being within the scope of one skilled in the art.

The adaptive detector decision strategy described with reference to FIGS. 3 and 5 compensates for ambient noise produced by light as well as compensating for the increased beam intensity at close emitter/photodiode separations.

While the particular example described herein has been made with reference to a system used in elevator doors, it is envisaged that the system and methods of the present invention may find application in any situation where obstruction sensing is required. These applications could include safety devices for industrial machinery, burglar alarms and door alarms in shops.

Where in the foregoing reference has been made to integers or components having known equivalents then such equivalents are herein incorporated as if individually set forth.

Although this invention has been described by way of example and with reference to possible embodiments it is to be understood that improvements or modifications may be made thereto without departing from the scope of the appended claims.

We claim:

1. A method of detecting an obstruction comprising: measuring a first signal;
    if the first signal is above a first voltage, an obstruction event is actioned for first signals which are less than a second voltage;
    if the first signal is substantially between a second voltage and a first voltage, then an obstruction event is actioned for first signals which are less than a third voltage;

a second signal representing the noise level is measured;

if the second signal is above a fourth voltage an obstruction event is actioned;

a third signal representing the noise level plus the signal level is measured;

if the third signal is less than the second signal by more than a fifth voltage an obstruction event is actioned; and if no obstruction event is actioned, the above process is repeated for a next emitter/photodiode pair in a predetermined sequence.

2. A method of detecting an obstruction as claimed in claim 1 wherein:

the first voltage is about 2.5 V;

the second voltage is about 1.5 V;

the third voltage is about 0.1 V;

the fourth voltage is about 3.5 V; and the fifth voltage is about 1.5 V.

3. A method of detecting an obstruction as claimed in claim 1 further including measurements taken between emitter/photodiode pairs wherein such pairs are sequentially selected to produce different scan patterns.

4. A method of detecting an obstruction as claimed in claim 1 wherein the scan sequence corresponds to the activation of substantially opposite emitter/photodiode pairs.

5. A method of detecting an obstruction as claimed in claim 1 wherein the scan sequence corresponds to the activation of emitter/photodiode pairs which are displaced vertically with respect to one another.

6. A method of detecting an obstruction in claim 1 wherein the obstruction sensing area corresponds to an area between two elevator doors and the obstruction event triggers the halting or opening of the elevator doors.

7. A method of detecting an obstruction comprising:

analyzing optical conditions in an obstruction sensing area and modifying obstruction event criteria based thereon;

determining the presence or absence of an obstruction based on that criteria wherein the optical conditions correspond to the intensity of one or more optical beams transmitted in such a manner so as define said obstruction sensing area and wherein the geometry of the obstruction detection area is determined from the sensed optical conditions;

sensing first optical conditions corresponding to no transmitted optical beams thereby determining the ambient optical conditions in the obstruction detection area;

sensing second optical conditions with transmitted optical beams thereby determining the transmitted beam intensity contribution to the total optical intensity in the obstruction detection area; and comparing the second optical conditions with obstruction event criteria thereby determining if an obstruction is present in the obstruction detection area.

* * * * *